(12) United States Patent
Li et al.

(10) Patent No.: US 12,733,599 B2
(45) Date of Patent: Sep. 15, 2026

(54) GREENHOUSE AUTOMATIC VINE DROPPING ROBOT AND VINE DROPPING METHOD

(71) Applicant: Shandong Agricultural University, Tai'an City (CN)

(72) Inventors: Tianhua Li, Tai'an City (CN); Haowen Zhang, Tai'an City (CN); Guoying Shi, Tai'an City (CN); Guanshan Zhang, Tai'an City (CN); Xiumei Guo, Tai'an City (CN); Yang Li, Tai'an City (CN); Wei Lou, Tai'an City (CN)

(73) Assignee: Shandong Agricultural University, Tai'an City (CN)

( * ) Notice: Subject to any disclaimer, the term of this patent is extended or adjusted under 35 U.S.C. 154(b) by 0 days.

(21) Appl. No.: 19/243,254

(22) Filed: Jun. 19, 2025

(65) Prior Publication Data

US 2026/0101855 A1 Apr. 16, 2026

(30) Foreign Application Priority Data

Oct. 10, 2024 (CN) ......................... 202411406555.6

(51) Int. Cl.

| | |
|---|---|
| ***A01G 17/00*** | (2006.01) |
| ***A01D 46/00*** | (2006.01) |
| ***A01D 46/24*** | (2006.01) |
| ***A01D 46/28*** | (2006.01) |
| ***A01G 9/00*** | (2018.01) |
| ***A01G 9/12*** | (2006.01) |
| ***A01G 9/26*** | (2006.01) |
| ***A01G 17/04*** | (2006.01) |
| ***G06V 20/00*** | (2022.01) |
| ***G06V 20/10*** | (2022.01) |

(52) U.S. Cl.

CPC ........... *A01G 17/04* (2013.01); *A01D 46/243* (2013.01); *A01D 46/28* (2013.01); *A01G 9/128* (2013.01); *A01G 9/26* (2013.01); *G06V 20/188* (2022.01)

(58) Field of Classification Search

CPC .......... A01G 17/04; A01G 9/128; A01G 9/26; G06V 20/188; A01D 46/243; A01D 46/28

See application file for complete search history.

(56) References Cited

U.S. PATENT DOCUMENTS

2024/0268288 A1 * 8/2024 Barth .................. A01G 31/045

* cited by examiner

*Primary Examiner* — Aaron G Cain

(74) *Attorney, Agent, or Firm* — HoustonHogle LLP

(57) ABSTRACT

Provided are a greenhouse automatic vine dropping robot and a vine dropping method. The vine dropping robot includes a mobile chassis, a lifting mechanism, a control cabinet, a front mechanical arm, a rear mechanical arm, an electric gripper, a light curtain sensor, and an optoelectronic switch. The control cabinet and the lifting mechanism are installed on the mobile chassis, and the two mechanical arms are fixed to a surface of a top platform of the lifting mechanism. The electric gripper is installed at a tail end of each of the two mechanical arms, the optoelectronic switch is arranged at a top end of a main shaft of the front mechanical arm, and the light curtain sensor is installed on the gripper at the tail end of the mechanical arm. The robot is suitable for greenhouse crops in the form of hooked-based vine dropping.

8 Claims, 7 Drawing Sheets

GREENHOUSE AUTOMATIC VINE DROPPING ROBOT AND VINE DROPPING METHOD

CROSS-REFERENCE TO RELATED APPLICATION

This patent application claims the benefit and priority of Chinese Patent Application No. 202411406555.6 filed with the China National Intellectual Property Administration on Oct. 10, 2024, the disclosure of which is incorporated by reference herein in its entirety as part of the present application.

TECHNICAL FIELD

The present disclosure relates to the technical field of agricultural robots, in particular to the field of vine dropping of robots, and specifically to a greenhouse automatic vine dropping robot and a vine dropping method.

BACKGROUND

At present, vine dropping cultivation in greenhouse has become the mainstream cultivation method of climbing crops. Vine dropping technology maximizes the greenhouse space utilization under limited land resources. By vertically distributing plants within the greenhouse, overlap and shading probability of the leaves are reduced, light exposure area of the crops is improved, internal air circulation in the greenhouse is enhanced, and pest and disease incidence is effectively mitigated.

Vine dropping operation is the most critical and complicated link in the vine dropping cultivation technology. Vine dropping technology primarily involves two vine dropping methods: a suspension rope-based method and a hook-based method. In the suspension rope-based vine dropping, a vine dropping rope is tied to a plant, and the other end of the vine dropping rope is tied to a higher area of the shed. When carrying out the vine dropping operation, the vine dropping rope tied to the higher area needs to be untied to lower the plant to a corresponding height, and then the vine dropping rope is tied again. In the hook-based vine dropping, a vine dropping hook is used to drop the vine with the cooperation of a rope sleeve, the vine dropping hook is hung at altitude higher area of the greenhouse, and the rope sleeve is wound in a rope groove of the hook; and during vine dropping, the height of the plant can be reduced only by releasing the rope sleeve on the hook by a certain distance.

Compared with the suspension rope-based vine dropping, the hook-based vine dropping is more convenient, but the existing hook-based vine dropping still requires manual operation, the vine dropping is huge in workload and requires aerial working, which has great defects in efficiency and safety, and the automation level still needs to be improved.

SUMMARY

For the disadvantages in the prior art, the present disclosure provides a greenhouse automatic vine dropping robot and a vine dropping method, which can carry out the hook-based vine dropping operation by replacing manpower, and thus the labor cost is effectively reduced, potential safety hazards are reduced, and the working efficiency of the vine dropping operation in the greenhouse is greatly improved.

The present disclosure is implemented through the following technical solutions. A vine dropping method of a greenhouse automatic vine dropping robot is provided, including the following steps:

step a. calculating an operation height, including: before a vine dropping hook is hung on vine hanging steel wire, detecting the vine hanging steel wire by an optoelectronic switch installed on a vine dropping robot, to determine a height of a vine dropping operation of a mechanical arm by the vine dropping robot according to a height difference between the optoelectronic switch and a tail end of the mechanical arm to ensure that the tail end of the mechanical arm is in a motion range of the vine dropping operation, and hanging the vine dropping hook wound with a vine dropping rope on the vine hanging steel wire fixed in a shed, and connecting a lower end of the vine dropping rope to a seedling vine of a plant;

step b. positioning the vine dropping hook, including: positioning the vine dropping hook by a light curtain sensor at the tail end of the mechanical arm of the vine dropping robot, where during an operation, the vine dropping robot travels along an inter-row path, and when the light curtain sensor detects the vine dropping hook, the vine dropping robot stops traveling, and the mechanical arm carries out vine dropping operation according to a motion trajectory designed by a program, and after one operation is completed, the mechanical arm is reset to a posture before the operation for subsequent operation; where in this method, the light curtain sensor at the tail end of the mechanical arm is configured to position the vine dropping hook, which can ensure the accuracy of a vine dropping action and improve the vine dropping quality and the vine dropping efficiency; and step c. designing the motion trajectory of the mechanical arm including: when the light curtain sensor detects the vine dropping hook, driving, by the mechanical arm, a gripper to move forward towards the vine dropping hook for a certain distance to enable the vine dropping hook to enter an opening-closing range of the gripper, and then closing the gripper to clamp the vine dropping hook; then, controlling the mechanical arm to move upward to lift the vine dropping hook, and driving, by the mechanical arm, the gripper to transversely move backwards by a certain distance, and driving the gripper to rotate the vine dropping hook by positive integer times of 180°; and finally, putting, by the mechanical arm, the vine dropping hook back to the vine hanging steel wire along an original path, and resetting the mechanical arm to an initial posture after the operation is completed; where in this method, the vine dropping is carried out by rotating the vine dropping hook, which makes the vine dropping action faster and more conveniently, and greatly improves the vine dropping efficiency.

In an embodiment, in step b, when the vine dropping hook enters a scanning range of the light curtain sensor, the vine dropping robot continues to travel; and when the vine dropping hook leaves the scanning range from the other edge of a light curtain, the vine dropping robot stops moving, and then the mechanical arm carries out the vine dropping operation. According to the arrangement of preferred solution, after the mechanical arm is reset to the initial posture, the vine dropping hook has left the scanning range of the light curtain range, thus preventing the light curtain sensor from repeatedly scanning the same vine dropping hook after the mechanical arm is reset.

In an embodiment, the vine dropping robot is provided with two mechanical arms arranged in a traveling direction, a spacing between the two mechanical arms in the traveling direction is a target spacing distance, the light curtain sensor is installed at a tail end of one of the two mechanical arms in front of the traveling direction, and before the two mechanical arms carry out the vine dropping operation, a spacing distance between the vine dropping hooks is adjusted at first, which includes: moving the vine dropping robot forward at a constant speed along the inter-row path, when a first vine dropping hook after entering the scanning range of the light curtain sensor at the tail end of the mechanical arm leaves the scanning range of the light curtain sensor from the other edge of the light curtain, starting timing, and after a certain period of time, having a second vine dropping hook adjacent to the first vine dropping hook entering the scanning range of the light curtain sensor, and stopping timing when the second vine dropping hook leaves the scanning range of the light curtain sensor, obtaining a distance by multiplying a timing duration by a traveling speed of the vine dropping robot as an actual spacing distance between adjacent vine dropping hooks; and then adjusting an actual spacing distance between two adjacent vine dropping hooks to the target spacing distance by moving the vine dropping hooks, thus facilitating two mechanical arms to carry out the vine dropping operation synchronously.

After the actual spacing distance between two adjacent vine dropping hooks is adjusted to the target spacing distance, adjusting a horizontal spacing between central lines of grippers of the two mechanical arms to the target spacing distance for the overall vine dropping operation, which includes: letting the vine dropping robot to travel along the inter-row path, considering the two adjacent vine dropping hooks as one group, and carrying out a synchronous operation, by the two mechanical arms, on a group of vine dropping hooks; when the light curtain sensor detects a second vine dropping hook in a group, stopping traveling of the vine dropping robot, such that the two adjacent vine dropping hooks are in corresponding operation ranges of mechanical arms, respectively; and then carrying out the vine dropping operation of the vine dropping hooks by the mechanical arms according to a designed trajectory. The efficiency of the vine dropping operation is further improved by carrying out the vine dropping operation simultaneously using the two mechanical arms.

This solution further provides an automatic vine dropping robot in a greenhouse used by the vine dropping method above, including a mobile chassis, and a lifting mechanism mounted on the mobile chassis, a mechanical arm installed at top of the lifting mechanism, and a gripper installed at the tail end of the mechanical arm and configured for clamping a vine dropping hook, a light curtain sensor installed at the tail end of the mechanical arm and facing a side where the vine dropping hook is located, and an optoelectronic switch installed on the mechanical arm and located above a plane where the gripper is located. The vine dropping robot in this solution can drive the whole machine to travel through the mobile chassis, adjust the height of the mechanical arm through the lifting mechanism, thus meeting vine dropping demands at different heights, and facilitating to lifting the vine dropping hook upwards, thereby providing guarantee for rotation of the vine dropping hook. By arranging the light curtain sensor, the vine dropping hook can be conveniently scanned, thus facilitating to operate the vine dropping hook.

In an embodiment, the mechanical arm includes an upright post fixedly connected to the lifting mechanism, a first arm body slidingly connected to the upright post in a vertical direction, a first driving device for driving the first arm body to move up and down along the upright post, a second arm body rotatably connected to the first arm body by a first vertical shaft, a third arm body rotatably connected to the second arm body by a second vertical shaft, a fourth arm body rotatably connected to the third arm body by a third vertical shaft; where the gripper is rotatably connected to the fourth arm body by a transverse shaft. The mechanical arm further includes a second driving device for driving the second arm body to rotate around an axis of the first vertical shaft, a third driving device for driving the third arm body to rotate around an axis of the second vertical shaft, a fourth driving device for driving the fourth arm body to rotate around an axis of the third vertical shaft, and a fifth driving device for driving the gripper to rotate around an axis of the transverse shaft. In this preferred solution, the first arm body is driven by the first driving device to move up and down, thus adjusting height of the gripper and then achieving adjustment of the operation height of the mechanical arm. By arranging each arm body, extension and retraction of the mechanical arm is achieved by means of rotation of each arm body, thus achieving the vine dropping operation of lifting, backward translation, rotation, forward translation and downward movement of the vine dropping hook.

In an embodiment, the lifting mechanism is of a scissor-type structure. The scissor-type structure includes a plurality of X-shaped units arranged in turn in a vertical direction, and two X-shaped units that are vertically adjacent to each other are hinged by a transverse connecting shaft. An outer sleeve and an inner sleeve are alternately arranged on respective transverse connecting shafts from top to bottom. A first sprocket and a second sprocket distributed in a vertical direction are rotatably installed on the inner sleeve, and the first sprocket and the second sprocket are in transmission connection through an annular chain. One side of the annular chain protrudes outward from a pipe wall of the inner sleeve, and an inner wall of the outer sleeve is fixedly provided with a tooth groove in fit with the annular chain. In this preferred solution, the scissor-type lifting mechanism in the prior art is improved. By arranging the outer sleeve and the inner sleeve, the annular chain can follow the transmission in the tooth groove during the extension and retraction of the scissor-type structure, and thus the friction between the inner sleeve and the outer sleeve during the lifting is reduced, the stability of the scissor-type structure is improved, and the jitter of the mechanical arm during the vine dropping operation is reduced.

The present disclosure has the beneficial effects that:

(1) The mechanical arm is used instead of manual work to carry out high-altitude vine dropping, which reduces both labor waste and safety hazards. The collaborative operation of two mechanical arms significantly improves operation efficiency.

(2) The vine dropping height is detected using the optoelectronic switch, the vine dropping hook is positioned using the light curtain sensor, and thus the development cost of an equipment is reduced in comparison with other positioning methods.

(3) A fixed operation motion trajectory of the mechanical arm is designed, and a control method is simplified. The movement of the mechanical arm along the fixed path improves the operating speed of the mechanical arm and reduces the error.

(4) A coordinating structure of the annular chain and the tooth groove is configured to fix the lifting mechanism transversely and vertically, which reduces the jitter of the lifting mechanism during the operation, improves the operating stability of the mechanical arm and reduces the operation error.

1—mobile chassis; 2—support base; 3—first slide way; 4—bottom pulley; 5—pulley motor; 6—link rod; 7—transverse connecting shaft; 8—connecting beam; 9—hydraulic rod; 10—connecting buckle; 11—inner sleeve; 11.1—annular chain; 11.2—first sprocket; 11.3—empty groove; 12—outer sleeve; 12.1—tooth groove; 13—top pulley; 14—second slide way; 15—load-bearing platform; 16—control cabinet; 16.1—touch screen; 16.2—main power switch; 16.3—scram button; 16.4—status indicator lamp; 17—front mechanical arm; 17.1—upright post; 17.2—first arm body; 17.3—second arm body; 17.4—third arm body; 17.5—fourth arm body; 18—optoelectronic switch; 19—rear mechanical arm; 20—gripper; 20.1—fixed joint; 20.2—rotary joint; 20.3—clamping phalanx; 20.4—light curtain sensor; 21—vine dropping hook; 22—vine dropping rope; 23—vine hanging steel wire.

DETAILED DESCRIPTION OF THE EMBODIMENTS

To describe the technical features of the solution clearly, the solution is set forth below with reference to specific embodiments.

Figure 1:
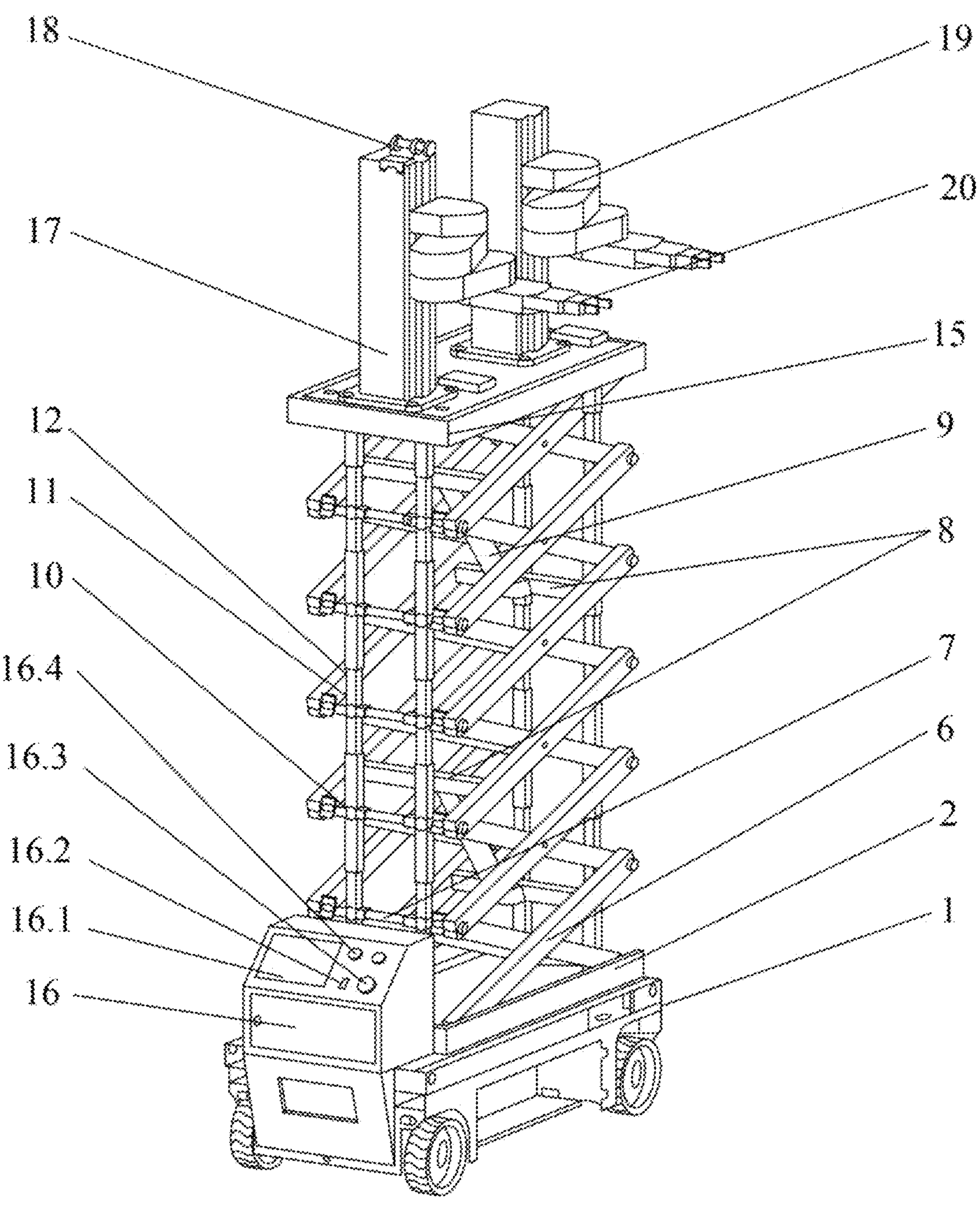
FIG. 1 is a diagram of an overall structure of a greenhouse automatic vine dropping robot according to the present disclosure.
Figure 2:
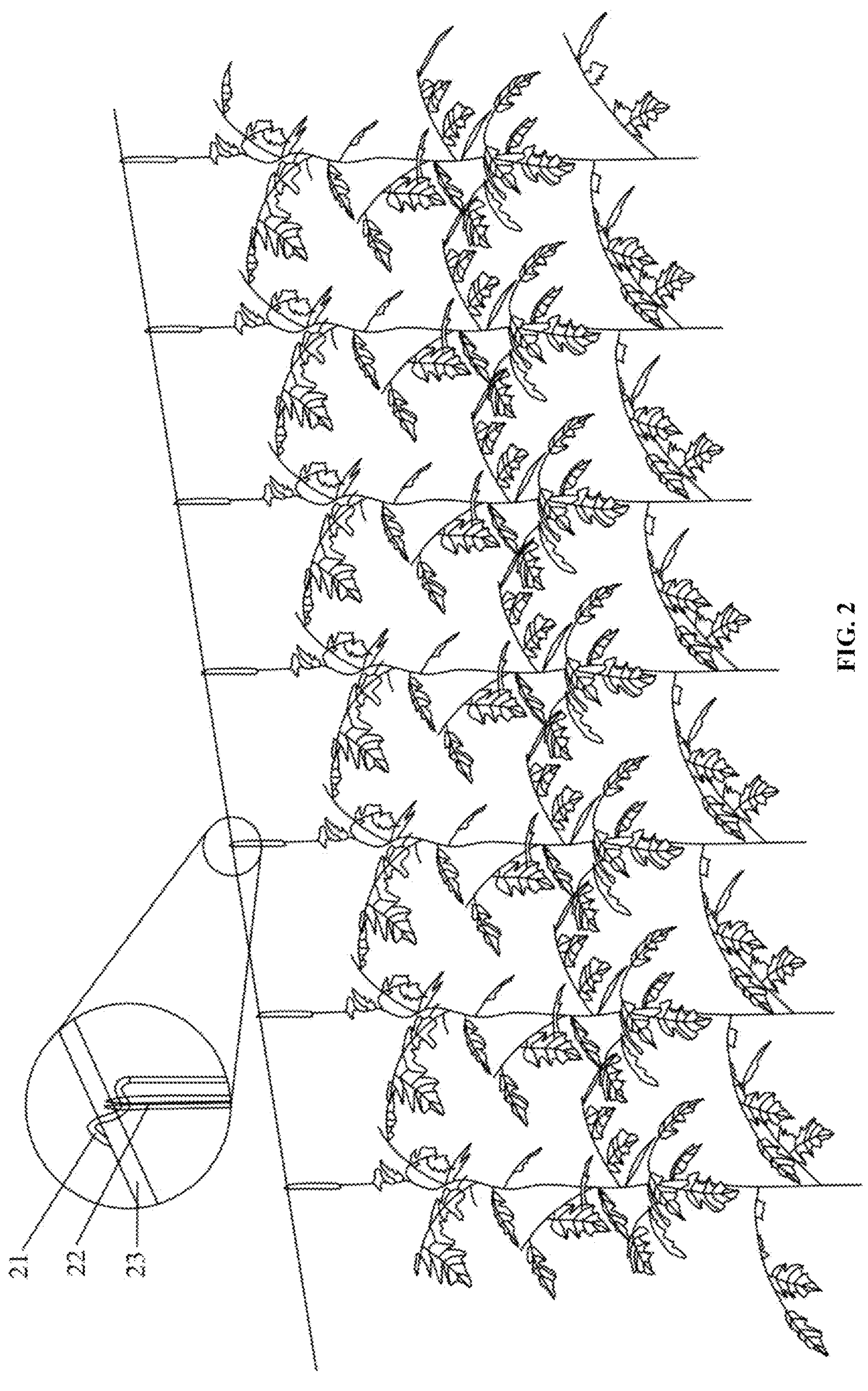
FIG. 2 is a diagram of a hook-based vine dropping scene in a greenhouse.

A greenhouse automatic vine dropping robot shown in FIG. 1 includes a mobile chassis 1, and a lifting mechanism and a control cabinet 16 mounted on the mobile chassis. A mechanical arm is mounted at the top of the lifting mechanism, a gripper 20 for clamping a vine dropping hook 21 and a light curtain sensor 20.4 facing a side where the vine dropping hook is located are installed at a tail end of the mechanical arm, and an optoelectronic switch 18 located above a plane where the gripper is located is further installed on the mechanical arm. In a height direction, the optoelectronic switch is 30 cm higher than the gripper. The control cabinet 16 is provided with a touch screen 16.1, a main power switch 16.2, a scram button 16.3, and a status indicator lamp 16.4. A chassis mobile system, a lifting system and a mechanical arm control system are all integrated into the control cabinet 16. Before the operation, the main power switch 16.2 needs to be turned on to power each mechanism, the scram button 16.3 can be pressed to stop the operation of the whole machine when the equipment fails in the operation process.

There are two mechanical arms in this embodiment, which are arranged in a traveling direction of the mobile chassis, and have the same structure for carrying out the vine dropping operation synchronously. The two mechanical arms are a front mechanical arm 17 and a rear mechanical arm 19. In the traveling direction of the mobile chassis, the front mechanical arm 17 is in front of the rear mechanical arm 19, the optoelectronic switch 18 is arranged at a top end of an upright post 17.1 of the front mechanical arm, and the light curtain sensor 20.4 is arranged at a tail end of the front mechanical arm.

During operation, the mobile chassis 1 carries other mechanisms during traveling, which features rear-wheel drive with front-wheel steering capability and can supply 220V AC power to other components. The control cabinet 16 is configured to control the mobile chassis 1, the lifting mechanism, the front mechanical arm 17, the rear mechanical arm 19, the optoelectronic switch 18, the gripper 20, and the light curtain sensor 20.4. The equipment is powered on by pressing the main power switch 16.2, and the status indicator lamp 16.4 can display an operating state of the lifting mechanism and the mechanical arm. The traveling speed of the mobile chassis and the height of the lifting mechanism can be adjusted through the touch screen 16.1, and meanwhile, the mechanical arm can be controlled.

The mechanical arm and the gripper at the tail end thereof may employ the prior art, as long as the gripper can move up and down, move away from or close to the vine dropping hook, and rotate around an axis extending in a front-back direction. For example, the gripper employs a rotary electric gripper in the prior art. The rotary electric gripper includes a fixed joint 20.1, a rotary joint 20.2, a clamping phalanx 20.3, and the light curtain sensor 20.4. The fixed joint 20.1 is embedded into the fourth arm body, the rotary joint 20.2 is placed at the top of the fixed joint 20.1 for rotation without angle limitation, and the clamping phalanx 20.3 is installed at a top end of the rotary joint 20.2 for opening-closing motion. The light curtain sensor 20.4 is installed on a left side surface of the fixed joint 20.1 of the mechanical arm, and can emit a sector-shaped light curtain within a certain distance from one side where the vine dropping hook is located and toward the side, the sector-shaped light curtain and the gripper 20 are located on the same horizontal plane, and have coincident central lines, and a maximum width of the light curtain is less than the opening-closing range of the clamping phalanx 20.3.

The mechanical arm includes an upright post 17.1 fixedly connected to the lifting mechanism, a first arm body 17.2 slidingly connected to the upright post in a vertical direction, and a first driving device for driving the first arm body to move up and down along the upright post. A second arm body 17.3 is rotatably connected to the first arm body by a first vertical shaft, a third arm body 17.4 is rotatably connected to the second arm body by a second vertical shaft, a fourth arm body 17.5 is rotatably connected to the third arm body by a third vertical shaft, and the gripper 20 is rotatably connected to the fourth arm body by a transverse shaft. The mechanical arm further includes a second driving device for driving the second arm body to rotate around an axis of the first vertical shaft, a third driving device for driving the third arm body to rotate around an axis of the second vertical shaft, a fourth driving device for driving the fourth arm body to rotate around an axis of the third vertical shaft, and a fifth driving device for driving the gripper to rotate around an axis of the transverse shaft. The second arm body 17.3 can rotate ±90° in a horizontal direction, the third arm body 17.4 can rotate ±164° in the horizontal direction; and the fourth arm 17.5 can rotate ±1080° in the horizontal direction. The first driving device may employ synchronous belt transmission or rack-and-gear transmission in the prior art, and the second driving device, the third driving device, the fourth driving device and the fifth driving device may all be powered by motors, and the specific structure will not be described in detail.

Figure 3:
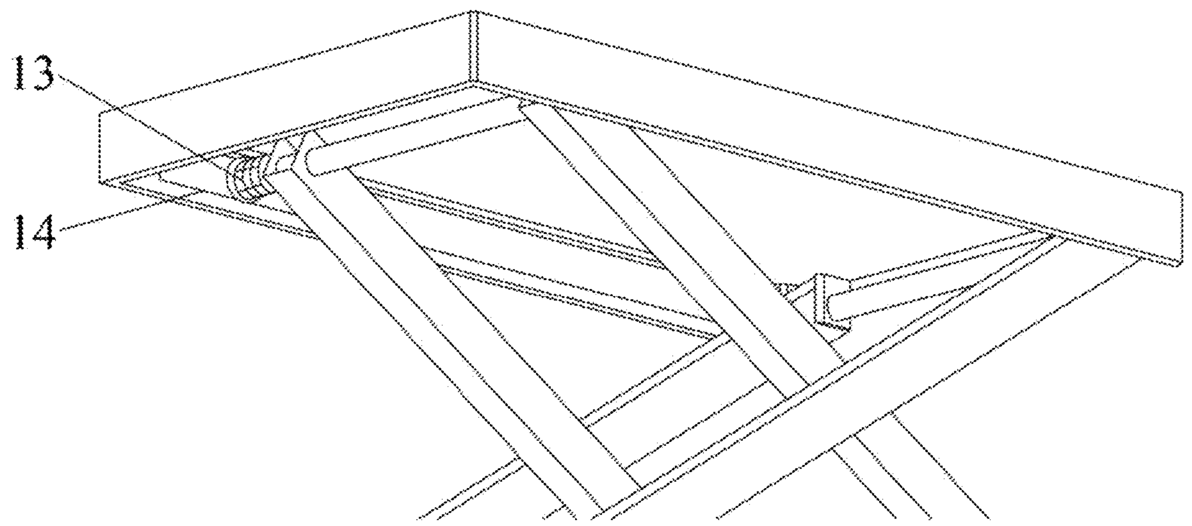
FIG. 3 is a diagram of a mounting structure of a top pulley of a lifting mechanism.
Figure 4:
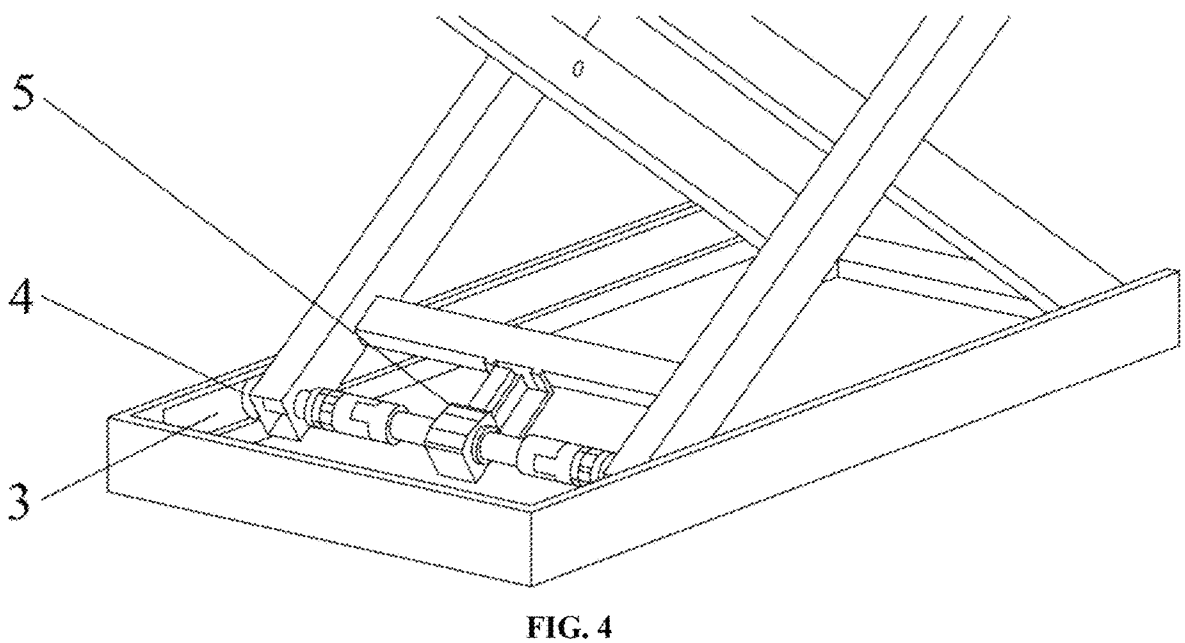
FIG. 4 is a diagram of a mounting structure of a bottom pulley of a lifting mechanism and a pulley motor.

The lifting mechanism is of a scissor-type structure, the scissor-type structure includes multiple X-shaped units arranged in turn in a vertical direction, two X-shaped units that are vertically adjacent to each other are hinged by a transverse connecting shaft 7, and a main body part of the scissor-type structure may employ the prior art. For example, as shown in FIG. 1, FIG. 3 and FIG. 4, the main body of the scissor-type structure includes a support base 2, a link rod 6, a connecting beam 8, a hydraulic rod 9, a transverse connecting shaft 7, a bottom pulley 4, a top pulley 13, a pulley motor 5, and a load-bearing platform 15. The support base 2 is mounted on the mobile chassis 1, and the mechanical arm is fixedly arranged to a top surface of the load-bearing platform 15. The link rods 6 are connected end to end to form the scissor-type structure, one end of the bottom link rod at the bottom is hinged with the support base 2, and the other end of the bottom link rod is provided with the pulley 4. The pulley 4 is embedded into a first slide way 3 on a sidewall of the support base, and driven by the motor 5, thus making an end point of the bottom link rod 6 move transversely in the lifting process. The link rods 6 are hinged end to end to form a scissor-type linkage assembly, and the link rods located on the same layer in the height direction form one X-shaped unit. The link rod 6 has a wide rectangular structure and hollow inside, which is light in weight and has certain stability. One end of the top link rod 6 is hinged with the load-bearing platform 15, and the other end of the top link rod 6 is provided with a pulley 13. The pulley 13 is embedded in a second slide way 14 on a lower plane of the load-bearing platform. The connecting beam 8 is placed in the linkage assembly, and the link rods on both sides are fixedly connected to the connecting beam 8. Both ends of the hydraulic rod 9 are hinged with the connecting beams 8, respectively. There are two hydraulic rods arranged vertically in the linkage assembly, each of which from its beginning to end spans three link rods, and have a certain fixing effect on the lifting mechanism. When the equipment is lifted, the two groups of hydraulic rods are in collaborative operation.

This solution is improved based on the existing scissor-type lifting structure. Specifically, the transverse connecting shaft 7 is extended to be connected to the end points of the link rods 6 on the opposite side, thus fixing the lifting mechanism transversely. An outer sleeve 12 and an inner sleeve 11 are alternately fixed to each transverse connecting shaft from top to bottom. Connecting parts of the transverse connecting shaft and the outer sleeve as well as the inner sleeve are fixed by a connecting buckle 10, making the inner sleeve and the outer sleeve extend and retract with the lifting mechanism. A first sprocket 11.2 and a second sprocket distributed in a vertical direction are rotatably installed on the inner sleeve, and the first sprocket and the second sprocket are in transmission connection through an annular chain 11.1. One side of the annular chain protrudes outward from a pipe wall of the inner sleeve, and an inner wall of the outer sleeve is fixedly provided with a tooth groove 12.1 in fit with the annular chain. In order to improve the stabilization effect, in this embodiment, three empty grooves 11.3 are formed in two opposite sidewalls of the inner sleeve 11, and the first sprocket 11.2 and the second sprocket are respectively installed in each empty groove 11.3. The improved structure of this solution allows the chain to follow the transmission in the tooth groove in the lifting process, which can reduce the friction between the inner sleeve and the outer sleeve in the lifting process. Through the transverse and longitudinal reinforcement of the lifting mechanism, the jitter generated by the lifting mechanism during operation is reduced, the operation accuracy of the mechanical arm is improved, and the working efficiency of the operation is improved.

Figure 5:
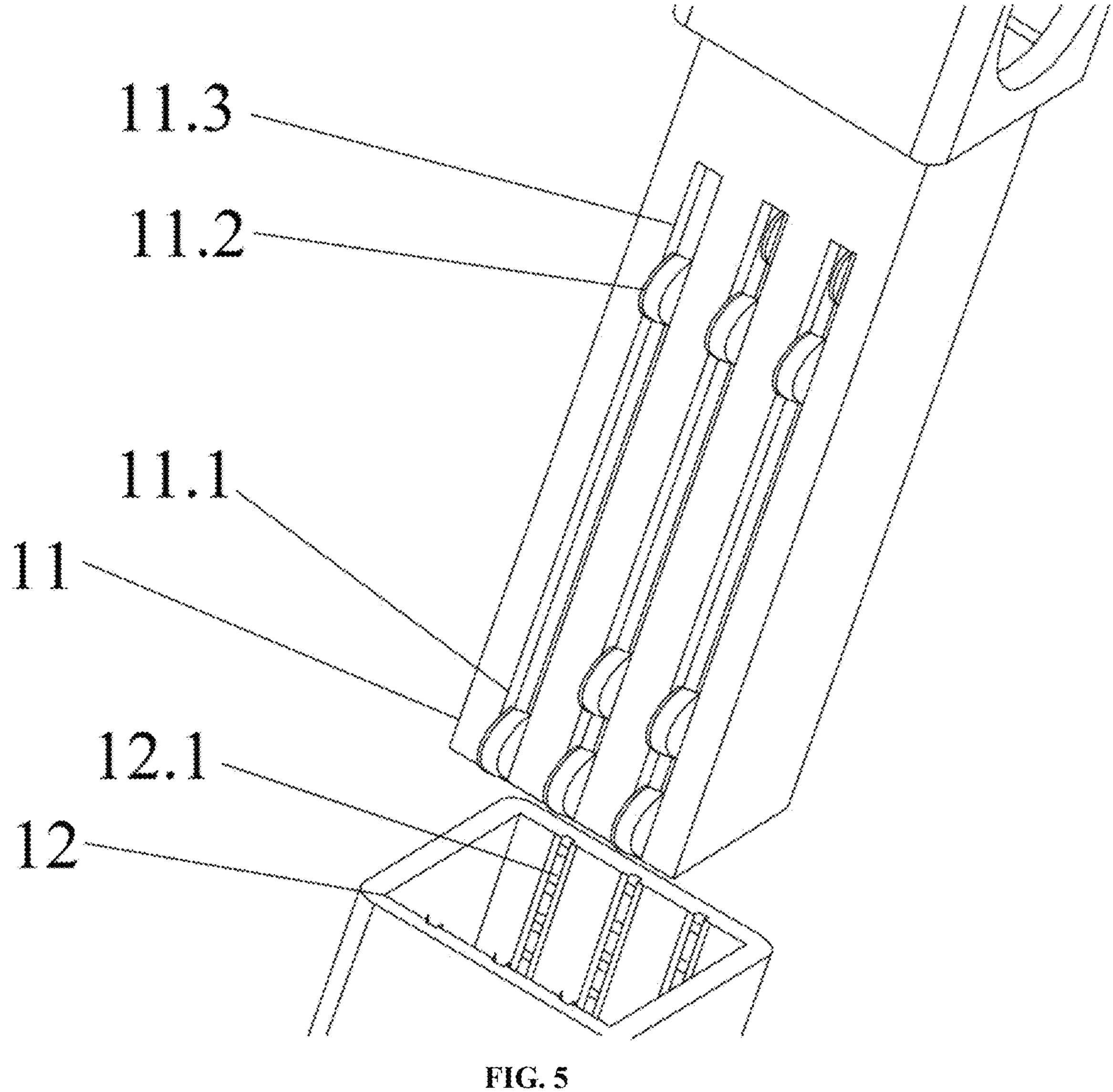
FIG. 5 is a structural diagram of an inner sleeve and an outer sleeve.
Figure 6:
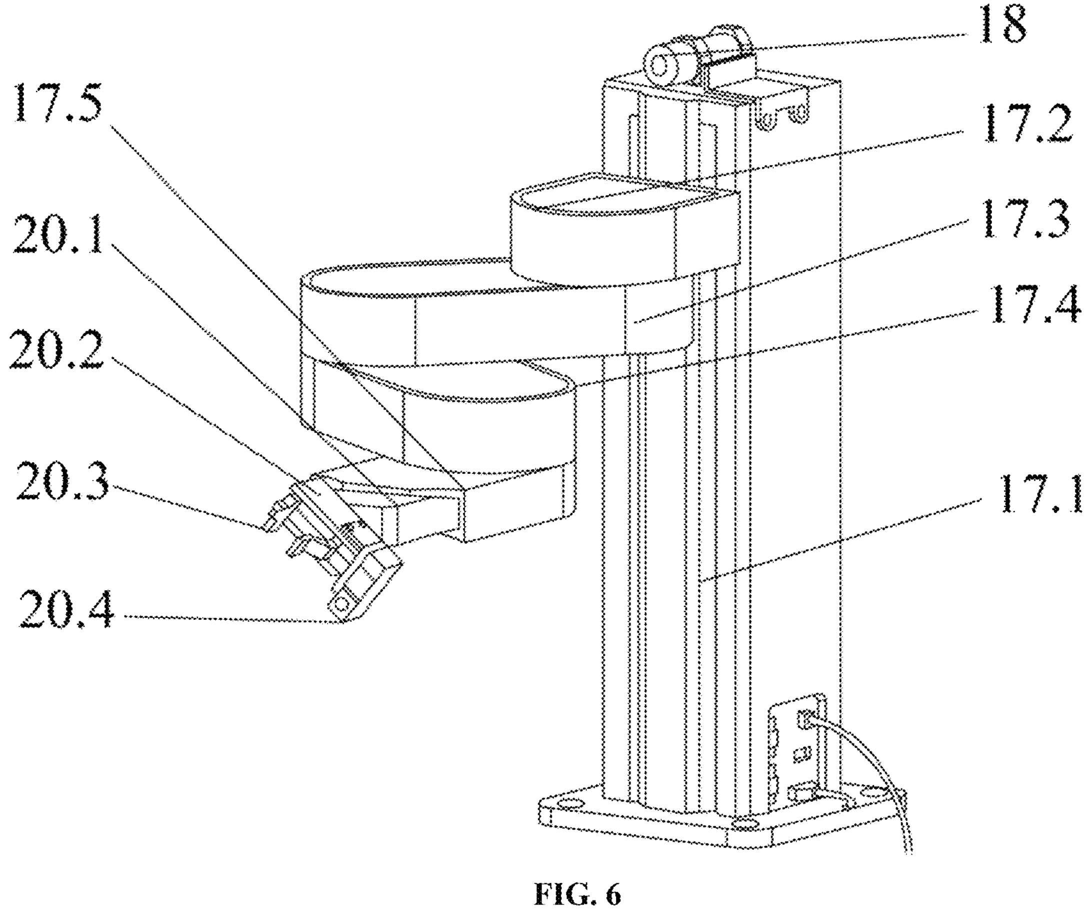
FIG. 6 is a structural diagram of a mechanical arm.
Figure 7:
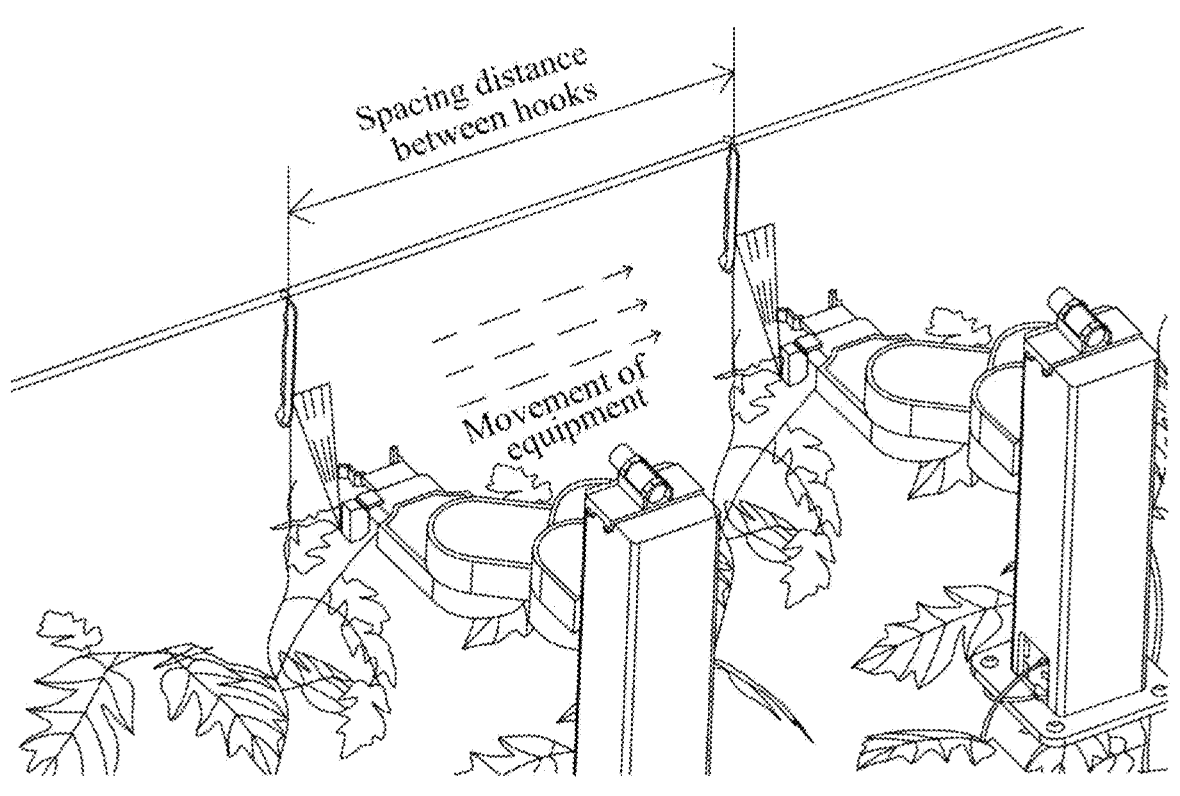
FIG. 7 is a diagram of a distance measurement method for adjacent vine dropping hooks.

The lifting mechanism can be powered by the hydraulic rod 9, and a hydraulic pump is mounted in the mobile chassis 1. As shown in FIG. 3 to FIG. 4, pulleys are mounted at the tail ends of the bottom and top link rods. The bottom pulley 4 is driven by a pulley motor 5 to assist the lifting mechanism to lift, and the top pulley 13 can slide transversely during the movement of the lifting mechanism. The lifting movement of the whole mechanism is achieved in the following ways: the link rods 6 are assembled in a scissor-type structure; in the lifting process of the lifting mechanism, the hydraulic pump controls the hydraulic rod 9 to provide power for a lifting action, the pulley motor controls the bottom pulley to move transversely to provide auxiliary power, and the top pulley moves transversely with the lifting process, thus achieving the lifting movement of the load-bearing platform. The link rods 6 on both sides are transversely connected and fixed by the transverse connecting shaft 7, and the transverse connecting shafts 7 are longitudinally connected by the inner sleeve 11 and the outer sleeve 12. As shown in FIG. 5, front and rear walls of the inner sleeve 11 are provided with rotatable chain groups, and an inner wall of the outer sleeve 12 is provided with tooth grooves for the chain to move. When the lifting mechanism moves up and down, the inner sleeve 11 and the outer sleeve 12 are configured to longitudinally fix the lifting mechanism, and the annular chain can move in the tooth grooves with the lifting movement. The transverse connecting shaft 7 as well as the inner sleeve 11 and the outer sleeve 12 are configured to fix the lifting mechanism in transverse and longitudinal directions, thus reducing the jitter in the operation process.

A vine dropping method using the greenhouse automatic vine dropping robot of this embodiment includes steps a-c.

In step a, an operation height is calculated. A plant in hook-based vine dropping cultivation is connected to a vine dropping hook 21 through a vine dropping rope 22, the vine dropping hook wound with a vine dropping rope is used to be hung on a vine hanging steel wire 23 fixed in a shed, and a lower end of the vine dropping rope is connected to a seedling vine of the plant. Before the vine dropping hook is hung on the vine hanging steel wire, the vine hanging steel wire is detected by an optoelectronic switch installed on a vine dropping robot, thus determining a height of a vine dropping operation of a mechanical arm of the vine dropping robot. A support base bearing the mechanical arm is lifted by controlling the lifting mechanism, in the process of moving up, the optoelectronic switch beam will scan the vine hanging steel wire, and at this time, the optoelectronic switch sends out a signal to a control system, a machine body stops moving after continuing to ascend by 30 cm, making the mechanical arm reach a proper operation height.

In step b, the vine dropping hook is positioned, which includes: positioning the vine dropping hook by a light curtain sensor at a tail end of the mechanical arm of the vine dropping robot. The vine dropping operation needs to be carried out before a growth height of the plant reaches a hanging height of the hook to prevent the leaves of the plant from interfering the positioning process. During the operation, the vine dropping robot travels along an inter-row path, when the light curtain sensor detects the vine dropping hook, the vine dropping robot stops traveling, and the mechanical arm carries out the vine dropping operation according to a motion trajectory designed by a program, and after one operation is completed, the mechanical arm is reset to a posture before the operation for subsequent operation. In order to prevent the light curtain sensor from repeatedly scanning the same vine dropping hook after the mechanical arm is reset, when the vine dropping hook enters a scanning range of the light curtain, the vine dropping robots continues to travel, and when the vine dropping hook leaves the scanning range from the other edge of the light curtain, the vine dropping robot stops moving, and then the mechanical arm carries out the vine dropping operation, and thus the vine dropping hook has left the scanning range of the light curtain sensor after the mechanical arm is reset to an initial posture.

In step c, the motion trajectory of the mechanical arm is designed. The principle of the hook-based vine dropping is to achieve the vine dropping by flipping the hook to release the vine dropping rope by a certain distance, and such a process is achieved by controlling the mechanical arm to move along a fixed trajectory. As the light curtain sensor and the gripper are located on the same horizontal plane, and the maximum width of the light curtain sensor is less than the opening-closing range of the gripper, when the light curtain sensor detects the vine dropping hook, the mechanical arm drives the gripper to move forward towards the vine dropping hook for a certain distance, enabling the vine dropping hook to enter an opening-closing range of the gripper, and then clamping phalanxes of the gripper are closed to form the clamping on the vine dropping hook. Afterwards, the mechanical arm is controlled to vertically move upward to lift the vine dropping hook, the mechanical arm drives the gripper to transversely move backwards by a certain distance, the gripper is driven to rotate the vine dropping hook by positive integer times of 180°, and finally, the mechanical arm is enabled to return the vine dropping hook to the vine hanging steel wire along an original path, the mechanical arm is reset to an initial posture after the operation is finished. In this step, the side where the vine dropping hook is located is the front, and the mechanical arm is located at a rear side of the vine dropping hook.

In order to improve the efficiency of vine dropping, the vine dropping robot in this solution is provided with two mechanical arms arranged in a traveling direction. The two mechanical arms operate synchronously and are completely consistent in operation actions. Therefore, it is necessary to unify the spacing distance between the vine dropping hooks in the shed before the overall operation. First, the fixed spacing distance between the adjacent hooks needs to be determined according to an actual demand, and then the actual spacing between the hooks is measured by using the light curtain sensor.

Specifically, a spacing between the two mechanical arms in the traveling direction is a target spacing distance, the light curtain sensor is installed at a tail end of the mechanical arm in front of the traveling direction, and before the two mechanical arms carry out the vine dropping operation, the spacing distance between the vine dropping hooks needs to be adjusted at first.

The vine dropping robot moves forward at a constant speed along the inter-row path, when a first vine dropping hook enters the scanning range of the light curtain sensor at the tail end of the mechanical arm and leaves the scanning range of the light curtain sensor front the other side, timing is started, and after a certain period of time, a second vine dropping hook adjacent to the first vine dropping hook enters the scanning range of the light curtain sensor, and timing is stopped when the second vine dropping hook leaves the scanning range of the light curtain sensor, a distance obtained by multiplying a timing duration by a traveling speed of the vine dropping robot is an actual spacing distance between the adjacent vine dropping hooks; and then the actual spacing distance between the two adjacent vine dropping hooks is adjusted to the target spacing distance by controlling the mechanical arm of the vine dropping robot to move the vine dropping hooks.

Figure 8:
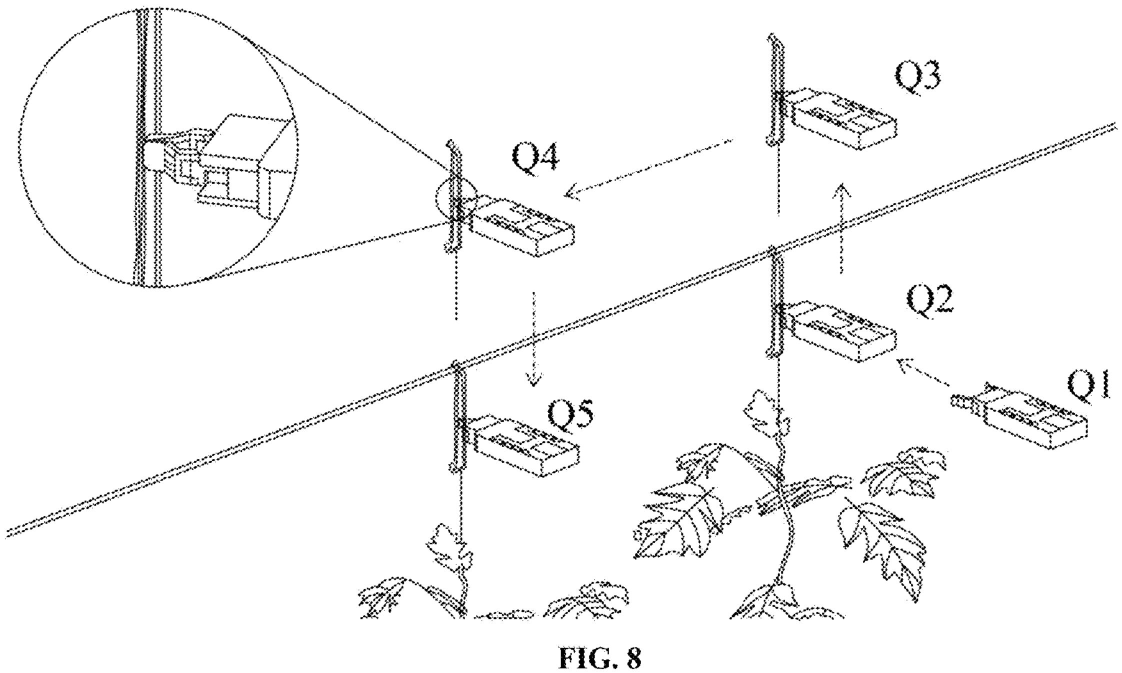
FIG. 8 is a diagram of an operation trajectory of a mechanical arm to adjust a spacing between adjacent vine dropping hooks.

Specifically, after the ranging is finished, the spacing distance between the vine dropping hooks is adjusted by the mechanical arm and the electric gripper, and the spacing between the hooks can be adjusted by moving the mechanical arm according to a fixed trajectory. The motion trajectory of the mechanical arm is shown in FIG. 8. The mechanical arm first moves from point Q1 to point Q2, and then phalanxes of the electric gripper are controlled to be closed to clamp the vine dropping hook. Afterwards, the mechanical arm moves longitudinally to lift the vine dropping hook to move to point Q3. Then, the system calculates a horizontal distance that the mechanical arm needs to move according to different spacings between hooks, and then hook is moved from point Q3 to point Q4, and then the mechanical arm descends to point Q5 to hang the hook again. Through such a method, the spacing distance between all hooks in the shed can be unified.

After the actual spacing distance between two adjacent vine dropping hooks is adjusted to the target spacing distance, a horizontal spacing between central lines of the grippers of the two mechanical arms is adjusted to the target spacing distance for the overall vine dropping operation. The vine dropping robot is enabled to travel at a constant speed along the inter-row path, the two adjacent vine dropping hooks are taken as one group, and the two mechanical arms are configured to carry out a synchronous operation on a group of vine dropping hooks. When the light curtain sensor detects the second vine dropping hook in the group, the mobile chassis is braked by the control system, and the vine dropping robot stops traveling, at this time, the two adjacent vine dropping hooks are in the operation ranges of the corresponding mechanical arms, respectively; and then the mechanical arms are enabled to carry out the vine dropping operation of the vine dropping hooks according to a designed trajectory. If the total number of the hooks in a single line is odd, the front mechanical arm is controlled to operate the remaining hooks alone.

Figure 9:
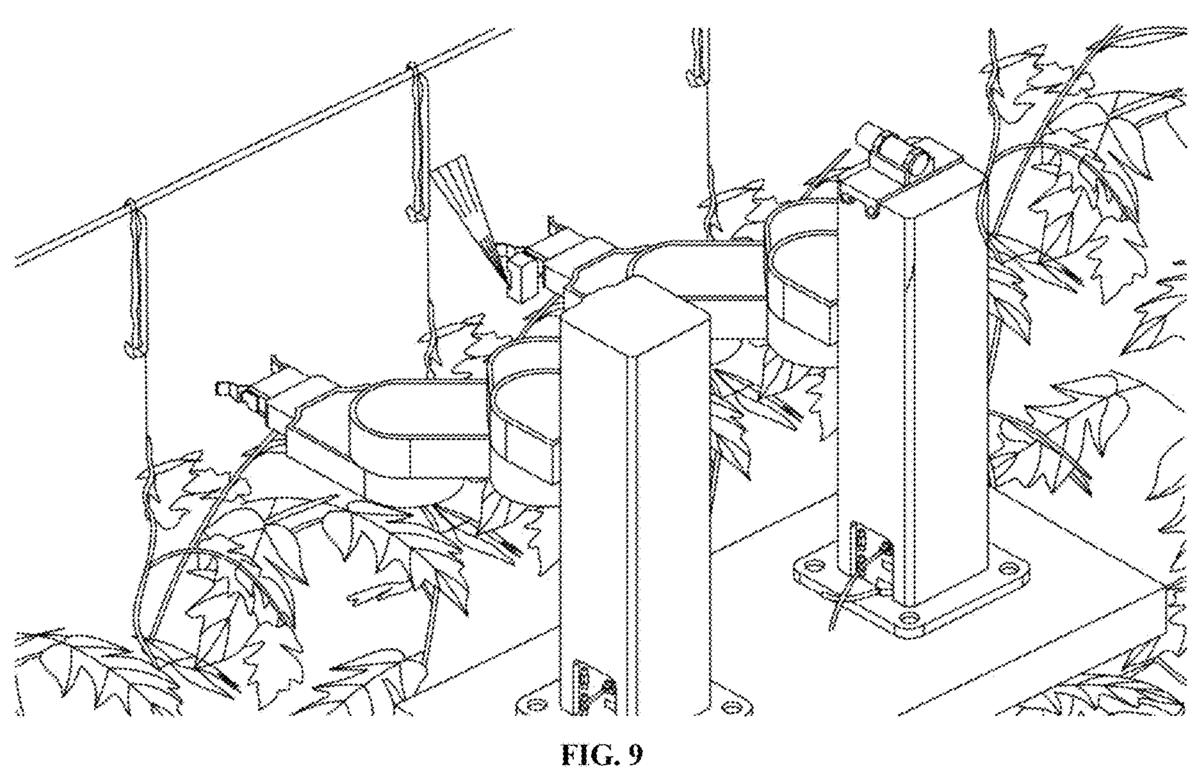
FIG. 9 is a diagram for positioning a vine dropping hook in the vine dropping operation process.
Figure 10:
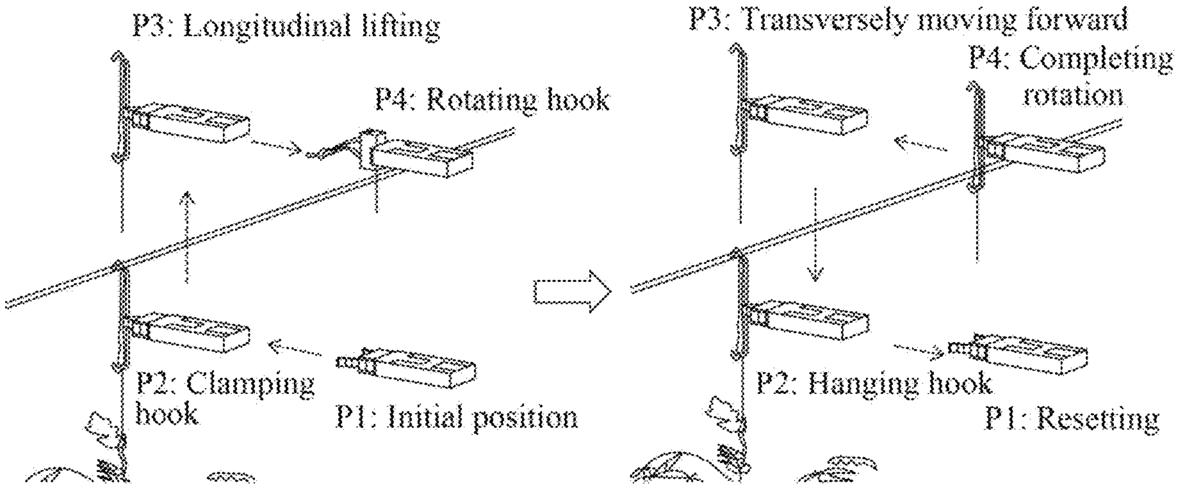
FIG. 10 is a diagram of a motion trajectory of a mechanical arm during vine dropping operation.

In conjunction with FIG. 9, when the light curtain sensor detects the second vine dropping hook in the group, the control system will activate braking on the mobile chassis, and at this time, the two adjacent vine dropping hooks are located in the operation ranges of the corresponding mechanical arms, respectively, and then the two mechanical arms will carry out the vine dropping operation according to the set motion trajectory to achieve synchronous picking and placing of the two adjacent vine dropping hooks. After the vine dropping hook is positioned by the light curtain sensor, the mechanical arm is controlled to move along the trajectory as shown in FIG. 10 to complete the vine dropping operation.

The mechanical arm moves from point P1 to point P2, and at this time, the electric gripper is controlled to clamp the vine dropping hook. Subsequently, the mechanical arm is controlled to drive the electric gripper to lift the vine dropping hook upwards to move to point P3. Then, the mechanical arm is enabled to translate backwards from point P3 to point P4, and at point P4, the electric gripper is controlled to rotate the hook by 180°. Afterwards, the mechanical arm is controlled to hang the vine dropping hook again through point P3 and point P2 in turn, and finally, the mechanical arm is reset to point P1.

The present disclosure is suitable for greenhouse crops in the form of hook-based vine dropping. Before starting work, the optoelectronic switch above the lifting mechanism is configured to detect the height of the vine hanging steel wire, thus making the mechanical arm reach an appropriate operation height without manually adjusting the height of the lifting mechanism, and the operation accuracy is improved. The vine dropping hook is accurately positioned using the light curtain sensor, and compared with other positioning methods, the used light curtain sensor is easy to develop, and the cost of the equipment is greatly reduced. The spacing between the adjacent hooks is adjusted by the mechanical arm, thus unifying the spacing distance between the adjacent vine dropping hooks. The mechanical arm is configured to take and place the vine dropping hook, and thus the automation of the vine dropping operation in the greenhouse is achieved, and the working efficiency of the vine dropping operation in the greenhouse is improved. The mechanical arm moves along the fixed trajectory during operation, thus achieving the sequential operation. By simplifying a path planning method of the mechanical arm, the operation time of a single vine dropping process is shortened, the operation efficiency is improved, and the operation error can be reduced by moving the mechanical arm along the fixed trajectory. The two mechanical arms can carry out vine dropping operation at the same time, and the spacing distance between the vine dropping hooks can be unified before the operation, which greatly improves the operation efficiency. The vine dropping operation for crops with different planting intervals can be achieved, and the robot is suitable for various operation environments.

Certainly, the above description is not limited to the above examples, and the technical features of the present disclosure that have not been described can be implemented by or by using the prior art, and thus will not be repeated here. The above embodiments and accompanying drawings are only used to illustrate rather than limiting the technical solution of the present disclosure. The present disclosure has been described in detail with reference to the preferred embodiments. It should be understood by those of ordinary skill in the art that changes, modifications, additions or substitutions made by those of ordinary skill in the art within the essential scope of the present disclosure without departing from the purpose of the present disclosure also belong to the scope of protection of the claims of the present disclosure.

What is claimed is:

1. A vine dropping method of a greenhouse automatic vine dropping robot, comprising:

step a, calculating an operation height, comprising: before a vine dropping hook is hung on a vine hanging steel wire, detecting the vine hanging steel wire by an optoelectronic switch installed on a vine dropping robot, to determine a height of a vine dropping operation of a mechanical arm by the vine dropping robot; and hanging the vine dropping hook wound with a vine dropping rope on the vine hanging steel wire fixed in a shed, and connecting a lower end of the vine dropping rope to a seedling vine of a plant, step b, positioning the vine dropping hook, comprising: positioning the vine dropping hook by a light curtain sensor at a tail end of the mechanical arm of the vine dropping robot, wherein during the operation, the vine dropping robot travels along an inter-row path, and when the light curtain sensor detects the vine dropping hook, the vine dropping robot stops traveling, and the mechanical arm carries out the vine dropping operation according to a motion trajectory designed by a program, and after one operation is completed, the mechanical arm is reset to a posture before the operation for subsequent operation; and step c, designing the motion trajectory of the mechanical arm comprising: when the light curtain sensor detects the vine dropping hook, driving, by the mechanical arm, a gripper to move forward towards the vine dropping hook for a certain distance to enable the vine dropping hook to enter an opening-closing range of the gripper, and then closing the gripper to clamp the vine dropping hook; then, controlling the mechanical arm to move upward to lift the vine dropping hook, and driving, by the mechanical arm, the gripper to transversely move backwards by a certain distance, and driving the gripper to rotate the vine dropping hook by positive integer times of 180°; and finally, putting, by the mechanical arm, the vine dropping hook back to the vine hanging steel wire along an original path, and resetting the mechanical arm to an initial posture after the operation is completed.

2. The vine dropping method of the greenhouse automatic vine dropping robot according to claim 1, wherein in step b, when the vine dropping hook enters a scanning range of the light curtain sensor, the vine dropping robot continues to travel; and when the vine dropping hook leaves the scanning range from an other edge of a light curtain, the vine dropping robot stops moving, and then the mechanical arm carries out the vine dropping operation.

3. The vine dropping method of the greenhouse automatic vine dropping robot according to claim 1, wherein the vine dropping robot is provided with two mechanical arms arranged in a traveling direction, a spacing between the two mechanical arms in the traveling direction is a target spacing distance, the light curtain sensor is installed at a tail end of one of the two mechanical arms in front of the traveling direction; and before the two mechanical arms carry out the vine dropping operation, a spacing distance between the vine dropping hooks is adjusted first, which comprises;

moving the vine dropping robot forward at a constant speed along the inter-row path, when a first vine dropping hook after entering the scanning range of the light curtain sensor at the tail end of the mechanical arm leaves the scanning range of the light curtain sensor from an other edge of a light curtain, starting timing, and after a certain period of time, having a second vine dropping hook adjacent to the first vine dropping hook entering the scanning range of the light curtain sensor, and stopping timing when the second vine dropping hook leaves the scanning range of the light curtain sensor, obtaining a distance by multiplying a timing duration by a traveling speed of the vine dropping robot as an actual spacing distance between adjacent vine dropping hooks; and then adjusting an actual spacing distance between two adjacent vine dropping hooks to the target spacing distance by moving the vine dropping hooks;

after the actual spacing distance between two adjacent vine dropping hooks is adjusted to the target spacing distance, a horizontal spacing between central lines of grippers of the two mechanical arms is adjusted to the target spacing distance for the overall vine dropping operation, which comprises:

letting the vine dropping robot to travel along the inter-row path, considering the two adjacent vine dropping hooks as one group, and carrying out a synchronous operation, by the two mechanical arms, on a group of vine dropping hooks; when the light curtain sensor detects a second vine dropping hook in a group, stopping traveling of the vine dropping robot, such that the two adjacent vine dropping hooks are in corresponding operation ranges of the mechanical arms, respectively; and then carrying out the vine dropping operation of the vine dropping hooks by the mechanical arms according to a designed trajectory.

4. A greenhouse automatic vine dropping robot used in the vine dropping method according to claim 1, comprising a mobile chassis (1), and a lifting mechanism mounted on the mobile chassis, a mechanical arm installed at top of the lifting mechanism, a gripper (20) installed at the tail end of the mechanical arm and configured for clamping a vine dropping hook (21), a light curtain sensor (20.4) installed at the tail end of the mechanical arm and facing a side where the vine dropping hook is located, and an optoelectronic switch (18) installed on the mechanical arm and located above a plane where the gripper is located.

5. The greenhouse automatic vine dropping robot according to claim 4, wherein in step b, when the vine dropping hook enters a scanning range of the light curtain sensor, the vine dropping robot continues to travel; and when the vine dropping hook leaves the scanning range from an other edge of a light curtain, the vine dropping robot stops moving, and then the mechanical arm carries out the vine dropping operation.

6. The greenhouse automatic vine dropping robot according to claim 4, wherein the vine dropping robot is provided with two mechanical arms arranged in a traveling direction, a spacing between the two mechanical arms in the traveling direction is a target spacing distance, the light curtain sensor is installed at a tail end of one of the two mechanical arms in front of the traveling direction; and before the two mechanical arms carry out the vine dropping operation, a spacing distance between the vine dropping hooks is adjusted first, which comprises;

moving the vine dropping robot forward at a constant speed along the inter-row path, when a first vine dropping hook after entering the scanning range of the light curtain sensor at the tail end of the mechanical arm leaves the scanning range of the light curtain sensor from an other edge of a light curtain, starting timing, and after a certain period of time, having a second vine dropping hook adjacent to the first vine dropping hook entering the scanning range of the light curtain sensor, and stopping timing when the second vine dropping hook leaves the scanning range of the light curtain sensor, obtaining a distance by multiplying a timing duration by a traveling speed of the vine dropping robot as an actual spacing distance between adjacent vine dropping hooks; and then adjusting an actual spacing distance between two adjacent vine dropping hooks to the target spacing distance by moving the vine dropping hooks;

after the actual spacing distance between two adjacent vine dropping hooks is adjusted to the target spacing distance, a horizontal spacing between central lines of grippers of the two mechanical arms is adjusted to the target spacing distance for the overall vine dropping operation, which comprises:

letting the vine dropping robot to travel along the inter-row path, considering the two adjacent vine dropping hooks as one group, and carrying out a synchronous operation, by the two mechanical arms, on a group of vine dropping hooks; when the light curtain sensor detects a second vine dropping hook in a group, stopping traveling of the vine dropping robot, such that the two adjacent vine dropping hooks are in corresponding operation ranges of the mechanical arms, respectively; and then carrying out the vine dropping operation of the vine dropping hooks by the mechanical arms according to a designed trajectory.

7. The greenhouse automatic vine dropping robot according to claim 4, wherein the mechanical arm comprises an upright post (17.1) fixedly connected to the lifting mechanism, a first arm body (17.2) slidingly connected to the upright post in a vertical direction, a first driving device for driving the first arm body to move up and down along the upright post, a second arm body (17.3) rotatably connected to the first arm body by a first vertical shaft, a third arm body (17.4) rotatably connected to the second arm body by a second vertical shaft, a fourth arm body (17.5) rotatably connected to the third arm body by a third vertical shaft, and the gripper (20) rotatably connected to the fourth arm body by a transverse shaft; the mechanical arm further comprises a second driving device for driving the second arm body to rotate around an axis of the first vertical shaft, a third driving device for driving the third arm body to rotate around an axis of the second vertical shaft, a fourth driving device for driving the fourth arm body to rotate around an axis of the third vertical shaft, and a fifth driving device for driving the gripper to rotate around an axis of the transverse shaft.

8. The greenhouse automatic vine dropping robot according to claim 4, wherein the lifting mechanism is of a scissor-type structure; the scissor-type structure comprises a plurality of X-shaped units arranged in turn in a vertical direction, two X-shaped units that are vertically adjacent to each other are hinged by a transverse connecting shaft, and an outer sleeve (12) and an inner sleeve (11) are alternately arranged on respective transverse connecting shafts from top to bottom; a first sprocket (11.2) and a second sprocket distributed in a vertical direction are rotatably installed on the inner sleeve, and the first sprocket and the second sprocket are in transmission connection through an annular chain (11.1); and one side of the annular chain protrudes outward from a pipe wall of the inner sleeve, and an inner wall of the outer sleeve is fixedly provided with a tooth groove (12.1) in fit with the annular chain.

* * * * *